United States Patent [19]

Symeon

[11] 4,144,206
[45] Mar. 13, 1979

[54] STATIC DISSIPATING HEAT CURABLE SILICONE RUBBER COMPOSITIONS
[75] Inventor: Gerald E. Symeon, Racine, Wis.
[73] Assignee: General Electric Company, Waterford, N.Y.
[21] Appl. No.: 869,085
[22] Filed: Jan. 13, 1978
[51] Int. Cl.$^2$ ............................................. C08L 1/00
[52] U.S. Cl. ................................. 260/9; 260/29.1 SB; 260/37 SB; 528/24; 528/32; 528/33; 528/42; 528/43; 260/DIG. 16; 260/DIG. 17
[58] Field of Search ..... 260/46.5 G, 37 SB, DIG. 16, 260/DIG. 17, 9; 528/24, 33, 32, 42, 43

[56] References Cited
U.S. PATENT DOCUMENTS

| | | | |
|---|---|---|---|
| 2,834,748 | 5/1958 | Bailey et al. | 260/42 |
| 2,917,480 | 12/1959 | Bailey et al. | 260/42 |
| 2,970,150 | 1/1961 | Bailey | 260/348 |
| 3,168,543 | 2/1965 | Black et al. | 260/448.2 |
| 3,505,377 | 4/1970 | Morehouse | 260/448.2 |
| 3,507,815 | 4/1970 | Bailey et al. | 260/2.5 |
| 3,629,165 | 12/1971 | Holdstock | 260/2.5 AH |
| 3,654,195 | 4/1972 | Raleigh | 260/2.5 AH |
| 3,965,150 | 6/1976 | Moeller | 260/486 R |

Primary Examiner—Melvyn I. Marquis
Attorney, Agent, or Firm—E. Philip Koltos; John L. Young; P. L. Schlamp

[57] ABSTRACT

A static dissipating heat curable silicone rubber composition comprising a diorganopolysiloxane polymer, a filler and a peroxide curing catalyst and as the static discharging agent a polyether-polysiloxane copolymer.

22 Claims, No Drawings

STATIC DISSIPATING HEAT CURABLE SILICONE RUBBER COMPOSITIONS

BACKGROUND OF THE INVENTION

The present invention relates to heat-curable silicone rubber compositions and particularly the present invention relates to heat-curable silicone rubber compositions which are hydrophilic and capable of dissipating static electricity.

Heat curable silicone rubber compositions are well known. Basically such compositions comprise a diorganopolysiloxane polymer, and extending or reinforcing filler, or mixtures thereof, which filler can be treated or untreated, and a peroxide curing catalyst. It is also common to facilitate the processing of such compositions by using various well known silicone process aids. The resulting ingredients are milled or mixed together in a doughmixer, formed to the desired shape and heated at elevated temperatures above 100° C. to cure the composition to a silicone elastomer. Such compositions have well known properties as insulation for various purposes, such as for instance electrical insulation for electrical wire cables, etc. It has also become known in the technology to make such heat curable silicone rubber compositions conductive. Such conductive heat curable silicone rubber compositions are produced by incorporating to such composition conductive carbon black, or a metal or metal particles in the composition. The resulting heat curable silicone rubber composition which is conductive while suitable for many purposes has the disadvantage it does not act as an electrical insulation material and in addition, the presence of the carbon black makes it very hard in the cured form such that it has a Durometer of 50 and above.

Recently, in the industry it has become desirable to produce heat-curable silicone rubber compositions which are conductive enough to dissipate static electricity while at the same time the composition is soft that it has a Durometer in the neighborhood of 30. For instance, in hospital operating rooms, there is always the danger of an explosion due to the build-up of static electricity in various apparatus which may cause electrical charge to form a spark in the presence of potentially explosive gases or liquids.

Accordingly, for many applications in such hospital operating rooms, it is desired to utilize heat-curable silicone rubber compositions because of their inertness to various chemicals and agents. However, some heat-curable silicone rubber compositions had the disadvantage that they could build-up electrical charges which might cause a spark and result in a possible fire or explosion. Accordingly, to remove the possibility of such fires or explosions due to the accumulation of static electricity, conductive heat-curable silicone rubber compositions were formulated for various parts in the operating room. Such conductive heat-curable silicone rubber compositions being able to dissipate static electricity and thus removing the possibility of a fire or an explosion. However, such static dissipating conductive heat curable silicone rubber compositions as explained above had the disadvantage that they were hard and abrasive to the human skin.

Accordingly, it was highly desirable to have a heat-curable silicone rubber composition which was conductive enough to dissipate static electricity but still retained its inertness and insulative properties and also was soft. To produce such static dissipating heat-curable silicone rubber compositions, it was suggested by some that there be incorporated into heat-curable silicone rubber compositions as static electricity dissipating additives, glycerin and polyethylene oxide glycol compounds. While such materials did result in a heat-curable silicone rubber composition which was conductive enough to dissipate static electricity, it had several disadvantages. One of the disadvantages of such compositions is they tended to have low physical properties, that is a very low tear and a very low tensile strength. It was also found in some cases that the glycerine additive or the glycol polyether additives in some cases interfere with the peroxide cure of the composition to form a silicone elastomer. Accordingly, it was highly desirable to find substitutes for such glyverin and glycol polyethers which could be added to heat-curable silicone rubber compositions to make such heat-curable silicone rubber composition sufficiently conductive to dissipate static electricity while the compositions retain their physical properties and in which such heat-curable silicone rubber compositions still had the desired insulative properties and softness. Also it was desirable to find static electricity dissipating additives for heat-curable silicone rubber compositions which additives did not interfere with the cure of the composition.

It is also desirable in the health care area to produce elastomers which are hydrophilic. Specifically, heat-curable silicone rubber compositions because of their inertness have a good suitability for the fabrication of parts where an elastomer is necessary. However, such silicone elastomers produced from heat-curable silicone rubber compositions have the disadvantage that they are not hydrophilic. Accordingly, it is desirable that such silicone elastomers have hydrophilic surfaces so they may become compatible for the various uses that they may be put to in the health care area. Thus, it is desired the heat-curable elastomer be hydrophilic such that they are compatible with various parts of the physical anatomy. Accordingly, for instance it is highly desirable that heat-curable silicone elastomers be hydrophilic so that they are compatible with blood plasma. Various methods were tried to make such heat-curable silicone elastomers hydrophilic, such as treating the surfaces of such silicone elastomers with various chemicals and ingredients so as to make the surface of the silicone elastomer hydrophilic.

Accordingly, it is highly desirable to be able to incorporate a static dissipating ingredient which is non-toxic and compatible with standard heat-curable silicone rubber compositions so as to make such heat-curable silicone rubber compositions hydrophilic.

Further, in the copying art for various rollers utilized in copying machinery, it is desirable to have present rollers made of a material which is static dissipating but have good physical properties.

In addition, prior art static-dissipating heat-curable compositions tended not to bond very well to substrates even with the use of primers.

Accordingly, it is one object of the present invention to provide for a heat-curable silicone rubber composition which is capable of dissipating static electricity.

It is another object of the present invention to provide for a heat-curable silicone rubber composition which is capable of dissipating static electricity and is hydrophilic in nature.

It is still another object of the present invention, to provide for a hydrophilic, static electricity dissipating, heat-curable silicone rubber composition which is suitable for the health care area and which has good physical properties, that is cured elastomer is soft.

It is yet an additional object of the present invention to provide a process for producing a heat-curable silicone rubber composition which is capable of dissipating static electricity, is hydrophilic in nature and has good physical properties, as well as provides good bonds to substrates with the use of primer compositions. These and other objects of the present invention are accomplished by means of the invention set forth hereinbelow.

SUMMARY OF THE INVENTION

In accordance with the above object there is provided by the present invention a static dissipating curable silicone rubber composition comprising (1) 100 parts by weight of a diorganopolysiloxane polymer having a viscosity varying from 1,000,000 to 200,000,000 centipoise at 25° C. where the organo group being selected from the class consisting of monovalent hydrocarbon radicals and halogenated monovalent hydrocarbon radicals. (2) 5 to 150 parts by weight of a filler (3) from 0.1 to 10 parts of peroxide curing catalyst (4) from 1 to 1.5 parts by weight of a polyether polysiloxane copolymer additive of the Formula, $$A_w\text{-}B_v$$

where A is the polysiloxane moiety and B is the polyether moiety where w is a whole number varying from 1 to 100 and v is a whole number varying from 1 to 200. The polyether moiety may consist of only ethylene oxide units, ethylene oxide and propylene oxide units or consist of ethylene oxide, propylene oxide and butylene oxide units. Various linkages may be utilized to link the polyether moiety to the polysiloxane moiety, including $Si - O - C$ linkages, $- Si\,(CH_2)_t$ linkages where t varies from 2 to 20 or $$-Si(CH_2)_t\overset{O}{\underset{\|}{C}}-O-$$

where t varies from 2 to 20. In the present case the most preferred linkage is the last linkage disclosed above, that is the $$Si(C)_t\overset{O}{\underset{\|}{C}}-O$$

which allows the static electricity dissipating additives to have the maximum efficiency in carrying out that function in the heat-curable silicone rubber composition of the present case. The polysilocane polyether copolymer of the instant case can have any desired structure, thus it can be linear or it can be trifunctional and the polyether units can be connected either to the silicone atoms in the linear chain or to the terminal silicone atoms of the polysiloxane at one end of the polysiloxane, or, the polyether moieties may be connected at both ends of the polysiloxane moirty or they can be connected at both ends of the polysiloxane moiety and also to silicone atoms in the internal portion of the polymer chain. In addition, the silicone moiety can be trifunctional with a polyether moiety attached to the polysiloxane moieties at the end of each of the polysiloxane moiety chains. As stated above there may be utilized a filler with the instant composition which can be either a reinforcing or an extending filler such as for instance as fumed silica. The filler may be treated or untreated. Preferably there may be utilized as the filler, fumed silica treated with a cyclic polysiloxane. The two main types of reinforcing fillers are treated or untreated fumed silica or precipitated silica. These fillers may be utilized alone, or in combination with, or completely substituted by extending fillers such as lithopone and calcium carbonate.

Generally, it has been found that the fumed silica and precipitated silica are preferred since they give the static electricity dissipating composition the best physical properties. These and other aspects of the present invention will be explained hereinbelow.

DESCRIPTION OF THE PREFERRED EMBODIMENT

Diorganopolysiloxane polymer that may be utilized in the present invention may have a viscosity varying anywhere from 1,000,000 to 200,000,000 centipoise at 25° C. The organo groups of such diorganopolysiloxane are well known for instance these organo groups can be selected from alkyl radicals, methyl, ethyl, propyl; alkenyl radicals, such as vinyl, allyl; cycloalkyl radicals such as cyclohexyl, cycloheptyl and mono-nuclear aryl radicals such as phenyl, methylphenyl, ethylphenyl, etc. In addition, the organo groups can be selected from halogenated monovalent hydrocarbon radicals such as halogenated alkyl radicals for instance 3,3,3 trifluoropropyl, etc. The diorganopolysiloxane polymer may have as organo groups any of the above radicals mentioned and can have a mixture of such radicals.

Most preferably, the organo groups of such diorganopolysiloxane polymer may be selected from lower alkyl radicals of 1 to 8 carbon atoms, vinyl radicals and phenyl radicals or 3,3,3 trifluoropropyl radicals. More specifically, the diorganopolysiloxane polymer may have the structural formula $$R_n^5 SiO_{\frac{4-n}{2}}$$

where $R^5$ may be any of the organo groups as specified above for the diorganopolysiloxane polymer and is most preferably selected from lower alkyl radicals of 1 to 8 carbon atoms, vinyl, phenyl and 3,3,3 trifluoropropyl radicals, and n varies from 1.9 to 2.1. Production of such diorganopolysiloxane polymers is well known. Briefly, production of such polymers comprises hydrolyzing the appropriate diorganodichlorosilanes, then taking the hydrolyzate and cracking it with an alkali metal hydroxide so as to preferentially distill off cyclotetrasiloxanes. To the cyclotetrasiloxanes which are distilled in pure form there is added small amounts of an alkali metal hydroxide such as potassium hydroxide or potassium silanolate catalyst at a concentration of anywhere of 5 to 500 parts per million of the total cyclic siloxanes present and the resulting mixture is heated at elevated temperatures of anywhere in the range of 100° to 200° C. to produce high molecular weight diorganopolysiloxane polymers, having a viscosity of anywhere from 1,000,000 to 2,000,000,000 centipoise at 25° C. In such a reaction, there is preferably utilized chainstoppers to set the final molecular weight of the diorganopolysiloxane polymer that is formed. Examples of such chainstoppers is for instance hexamethyldisiloxane, octamethyltrisiloxane, divinyltetramethyldisiloxane, etc. These chainstoppers are used in appropriate quantities that is necessary to obtain the desired viscosity of the diorganopolsyiloxane polymer that is formed in the above reaction. The reaction which is an equilibration procedure may take anywhere from 1 to 12 hours and is terminated when the maximum amount of diorganopolysiloxane polymer is formed from the cyclictetrasiloxane.

Accordingly, when this endpoint is reached, that is when about 85% by weight of the cyclictetrasiloxanes have been converted to the linear diorganopolysiloxane polymer, the basic catalyst is neutralized with an acid such as phosphoric acid and the undesirable volatiles are vented off and recycled for use in another equilibration reaction. The resulting residue polymer that is formed is a diorganopolysiloxane polymer of the foregoing viscosity. Fluorosilicone substituted polysiloxanes may be formed in much the same way by the use of cyclictetrasiloxanes or cyclictrisiloxanes as for instance as disclosed in the process of Evans Ser. No. 716,623 now abandoned which is incorporated in the present case by reference.

With such a diorganopolysiloxane polymer the base ingredient in the composition of the instant case there may be utilized per a hundred parts of diorganopolysiloxane polymer from 5 to 150 parts by weight of a filler. Such a filler may be a reinforcing filler such as fumed silica and precipitated silica which may be treated or untreated, the common treating agents for such reinforcing filler being cyclictetrasiloxanes and silazanes. In addition, extending fillers such as titanium dioxide, lithopone, zinc oxide, zirconium silicate, silica aeaogel, iron oxide, diatomaceous earth, calcium carbonate, glass fibers, magnesium oxide, chromic oxide, zirconium oxide, aluminum oxide, alpha quartz and calcined clay may be utilized as a filler in the instant case. However, it is not preferred to utilize the conductive type of carbon black in the invention of the instant case since it would make the instant composition too hard. As has been said previously, per 100 parts of the diorganopolysiloxane polymer there is utilized from 5 to 150 parts by weight of a filler and more preferably from 10 to 100 parts by weight of a filler. The extending fillers can also be treated or untreated with various treating agents so as to make them more easily to disperse in the diorganopolysiloxane polymer, and to improve the final properties of the diorganopolysiloxane elastomer that is formed from the ingredients of the instant case. Preferably there is utilized as a filler in the invention of the composition of the instant case, fumed or precipitated silica as they enhance the physical properties of the resulting cured elastomer that is formed.

Another ingredient in the composition of the instant case, so as to cure the composition, there may be added is from 0.1 to 10 parts by weight of a peroxide curing catalyst based on 100 parts of the diorganopolysiloxane polymer and more preferably, from 0.1 to 5 parts by weight of the peroxide curing catalyst.

The curing of the silicone rubber composition of the present invention can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

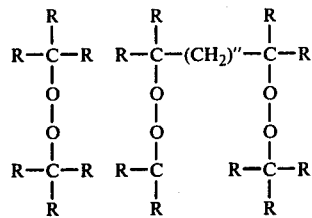

wherein R represents the same alkyl group throughout, or alkyl groups of two or more different types and n is zero or a larger integer.

Among the specific peroxide curing catalysts that are preferred are di-tertiary-butyl peroxide, tertiarybutyl-triethylmethyl peroxide, tertiary-butyl-tertiary-butyl-tertiary-triphenyl peroxide and di-tertiary alkyl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl-aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc.

To facilitate the mixing of the ingredients and more specifically the filler in the composition of the instant case and specifically into the diorganopolysiloxane polymer which is of a high viscosity, there is normally utilized a process aid to facilitate the mixing. Such a process aid's main function is to facilitate the mixing of the filler into the diorganopolysiloxane polymer without having the filler clump up. Normally the filler will be treated with cyclicpolysiloxanes or silazanes or fatty acids in the case of the extending fillers so as to allow the fillers to mix into the diorganopolysiloxane polymer with facility. In the flurosilicone diorganopolysiloxane polymers in accordance with the instant case, it is desired that the flurosilicone process aids be utilized although the process aids disclosed below may be utilized for such flurosilicone diorganopolysiloxane polymers with some advantage.

There is also employed in the present composition 1 to 25 percent and preferably 5 to 15 percent by weight based on the polydiorganosiloxane gum of a process aid for preventing the gum and the filler mixture from structuring prior to curing and after compounding. One example of such a process aid is a compound of the formula,

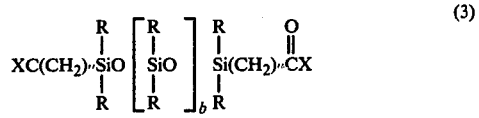

(3)

where R is a member selected from the class consisting of methyl and phenyl, X is a member selected from the class consisting of —OH, —NH$_2$ or —OR′, where R′ is methyl or ethyl, n has a value of from 2 to 4, inclusive, and be is a whole number equal to from 0 to 10, inclusive. Further details as to the properties, as well as the method of preparation of the compound of formula (3), are to be found in the disclosure of Martellock U.S. Pat. No. 3,464,945 which is herein incorporated by reference.

The process aid may also be a dihydrocarbon-substituted polysiloxane oil having a hydrocarbon substituted to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the hydrolysis, depolymerization and fractional distillation procedures described in detail above with reference to the preparation of the gum of formula (1). Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as 35 and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. No. 2,954,357 which is hereby incorporated into this specification by reference.

There may also be used as a process aid hydroxylated organosilanes which contain from one silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there by present in said organosiloxane from one OH to 70 silicon atoms to two OH per silicon atom.

The hydroxylated siloxanes may be prepared by any suitable method, such as heating said siloxanes with steam under pressure at temperatures of about 120° C. or hydrolyzing silanes of the formula $R_nSiX_{4-n}$ where X is any hydrolyzable group such as Cl, OR, H, —OOR and R is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Knokle et al U.S. Pat. No. 2,890,188, the disclosure of which is being incorporated into this application by reference.

Any of the above process aids may be used alone or mixtures thereof may be used in the above-defined concentrations. Further, other suitable process aids may also be used in the silicon rubber compositions of the present invention. Such ingredients are, for instance, disclosed as common in Glaister U.S. Pat. No. 3,933,726 which is incorporated into the parent case by reference.

Generally such process aids are added to the diorganopolysiloxane polymer to mix the filler into the polymer which mixing is usually carried out in a dough-mixer. It is preferred to utilize a process aid in the invention of the instant case so as to mix the filler into the diorganopolysiloxane polymer with facility and also so as to prevent structuring of the composition prior to cure. The above forms the basic composition of the instant case with minus of course the antistatic dissipating compound of the instant case. In addition, other ingredients may be utilized in the above composition as is well known in the heat vulcanizable silicone rubber composition art such as pigments, such as heat agent additives, such as structure controlling additives, such as compression set additives, such as oil resistant additives. For instance, there may be incorporated in the above composition, a small quantity of magnesium oxide to increase the solvent resistance of the composition. With respect to the diorganopolysiloxane base polymer, it is preferred that the organo groups in one instance be selected from methyl, phenyl and vinyl.

Accordingly, for maximum static dissipating properties, it is desired that the diorganopolysiloxane polymer generally contain anywhere from 0.002 to 0.5 weight percent of vinyl groups and more preferably from 0.002 to 0.2 weight percent of vinyl groups. In addition, for maximum static dissipating properties desired that the diorganopolysiloxane polymer may have anywhere from 1 to 10 weight percent of phenyl substituent groups and more preferably from 1 to 5 weight percent of phenyl groups.

Finally, in the compositions of the instant case, there must be present the static dissipating polyether polysiloxane copolymers of the instant case. As set forth above, broadly the polyether polysiloxane copolymer additive of the instant case may have the formula $A_W \cdot B_V$ where A is the polysiloxane moiety and B is the polyether moiety where broadly W is a whole number varying from 1 to 100 and B is a whole number varying from 1 to 200. Such copolymers are well known in the art.

Generally there may be utilized from 0.1 to 1.5 parts by weight of the polyether polysiloxane copolymer and more preferably 0.25 to 0.7 parts by weight of the polyether polysiloxane copolymer per hundred parts of the diorganopolysiloxane base polymer. The polyether moiety may be appended to the polysiloxane moiety in any convenient fashion. For instance, the linkage may be Si—O—C,

or Si $(CH_2)_t$ where t varies from 2 to 20. It should be noted that the Si—O—C linkage is not preferred since such a linkage is unstable to water and water will cause the bond to break. The other two linkages, are more preferred since they are more resistant to hydrolytic degradation. It should be noted that such materials are well known for a surfactant for polyurethane foams and there are many examples of them. As far as is known, most of such polyether polysiloxane copolymers will function in the inventions in the compositions of the instant case to act as static dissipating additives to heat curable silicone rubber compositions. It should be noted that the polyether moiety in the polyether polysiloxane copolymers of the instant case, may be composed of only ethylene oxide units or can be composed of ethylene oxide and propylene oxide units or be composed of ethylene oxide, propylene oxide and butylene oxide units or be composed of ethylene oxide and butylene oxide units.

The more preferred polyether polysiloxane additives for use in the instant invention is one having the formula,

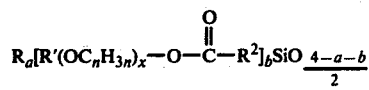

where R and R' are monovalent hydrocarbon radicals of less than 8 carbon atoms $R^2$ is selected from alkylene and aryl radicals of up to 20 carbon atoms; n is an integer that varies from 2 to 4; x varies from 5 to 30; for the case n is equal to 2 and x varies from 1 to 40 for the case n equals to 3 or 4 where there may be ether units with n equals to 2, 3 and 4 in the same molecule; a is a whole number that varies from 1.51 to 1.99 and b varies from 0.019 to 0.45 the sum of a + b varies from 2.012 to 2.1. Such polysiloxane polyether copolymers are for instance, disclosed in Moeller U.S.P. 3,965,150 which disclosure is incorporated in the present case by reference. Another polyether polysiloxane additive which is preferred in the invention of the instant case is one having the formula,

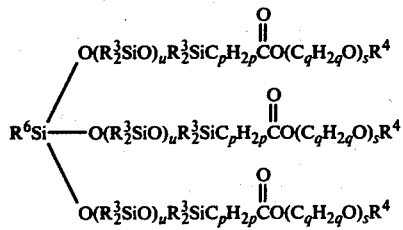

where $R^6$ and $R^3$ are monovalent hydrocarbon radicals, $R^4$ is a lower alkyl radical, 1 to 8 carbon atoms u has a value of at least 2, p has a value from 2 to 3, inclusive, q has a value from 2 to 4, inclusive and s has a value of at least 5. Disclosure of such compounds as well as their method of preparation is set forth in Holdstock U.S. Pat. No. 3,629,165 which is incorporated into the present case, by reference. Examples of other patents that refer to such polyether polysiloxane polymers and their method of preparation are for instance Bailey and O'Connor U.S. Pat. Nos. 2,834,748 and 2,917,480; Bailey 2,970,15 and 3,507,815; Morehouse 3,505,377 and Morehouse United Kingdom Pat. No. 1,088,493 and French Pat. No. 1,550,037. In addition, there is United Kingdom Pat. No. 1,149,744, Netherland Pat. No. 6,601,308 and U.S. Pat. Nos. 3,168,543 as well as Raleigh 3,654,195. All of these patents are incorporated into the present case by reference. It should be noted that the invention of these polymers is not the invention of the instant case. There are other examples of patents of such polyether polysiloxane copolymers; however, to recite all of them would unduly prolong the instant specification. Suffice to state that as far as is known all such polyether polysiloxane copolymers function as static dissipating additives in the invention of the instant case. It should be noted that the invention of the instant case does not lie in the preparation of such polyether polysiloxane copolymers but lies in their use in a heat curable silicone rubber composition to produce static dissipating heat curable silicone rubber composition that is not totally conductive. The preparation of the SiO—C linkage polyether polysiloxane copolymer is well known in the art. Briefly, alkoxylated polysiloxane is reacted with a hydroxy terminated polyether to produce the desired copolymer. For the $Si(CH_2)_t$ linkage the most convenient preparation seems to be the reaction of a hydrogen containing polysiloxane with an olefinic containing polyether in presence of a platinum catalyst. This method can also be used in the production of those polyether polysiloxane copolymers in which the linkage is

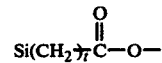

where t is defined previously. Such polyether polysiloxane copolymers may also be prepared by reacting an olefinic containing acid with a polyether containing a hydroxl group and then reacting the resultant olefinic polyether compound with a hydrogen polysiloxane with the hydrogen groups in the desired location in the polysiloxane chain to produce the desired polyether polysiloxane copolymer which is the static dissipating additive of the instant case.

It should be noted that the polyether groups need not be appended to the linear end of a polysiloxane chain. The polyether groups may be appended either to one terminal position of the polysiloxane chain or they may be appended on both terminal positions of a linear polysiloxane chain. In addition the polyether groups can be appended to the silicone atoms in the polysiloxane/chain as well as to silicone atoms at both the terminal positions of the polysiloxane chain. In addition, there may be utilized as a static dissipating additive in the compositions of the instant case a compound where the polyether is appended to the silicone atoms at the ends of polysiloxane chain which polysiloxane chain emanates from a trifunctional silicone atom, as disclosed in the foregoing Holdstock U.S. Pat. No. 3,629,165. These compounds may be obtained by reacting a hydrogen polysiloxane to add on the olefinic polyether group to the hydrogen atom of a polysiloxane polymer to produce the copolymer which reaction is well known. For instance, various polyethers may be reacted together and in addition with an olefinic alcohol or olefinic acid to produce the desired olefinic polyether moiety. The resulting olefinic polyether moiety may then be reacted with a hydrogen polysiloxane in the presence of platinum catalyst to produce the desired polyether polysiloxane copolymer. Alkoxy containing polysiloxanes or hydrogen containing polysiloxanes can be prepared by methods well known in the art. Briefly, such methods comprise equilibrating cyclic-tetrasiloxanes having hydrogen alkoxy groups in them in the presence of a mild acid such as toluene sulfonic acid at temperatures in the range of 100° to 200° C., in the presence of the appropriate amount of chainstoppers, the chainstoppers that may be used are alkoxy or hydrogen containing chainstoppers as is desired to produce the desired hydrogen containing polysiloxane within the scope of the instant case or to produce the alkoxy containing polysiloxane within the scope of the instant case. Accordingly, after the hydrogen polysiloxane or alkoxy containing polysiloxane which may have a viscosity of anywhere from 50 to 500,000 centipoise at 25° C. is equilibrated in the presence of a mild acid such as toluene sulfonic acid or acid activated clay such as filtrol sold by Filtrol Corporation of Los Angeles, California, the equilibration reaction is terminated. The acid is neutralized with a mild base and the cyclics are vented off to give the desired hydrogen polysiloxane or alkoxy containing polysiloxane.

This material is ready to be utilized in a SiH olefin reaction to react with the olefinic polyether in the presence of a platinum catalyst to produce desired polyether polysiloxane copolymers which can be utilized as static dissipating ingredient in the invention of the instant case. As stated previously hydride containing chainstoppers may be utilized so as to produce hydride terminated hydrogen polysiloxanes which when reacted with olefinic polyether would result in polyether groups being appended to terminal positions of the polysiloxane chain. Such hydrogen polysiloxane may also be reacted with alcohol to impart alkoxy group to the polysiloxane as such so that it can react with a polyether to produce the foregoing polyether polysiloxane copolymers with an SiOC linkage. Such a reaction is preferred to produce the alkoxy containing polysiloxanes since alkoxy-containing cyclictetrasiloxanes are equilibrated with difficulty such as to arrive at a polysiloxane polymer having the desired alkoxy substituent groups intact after the equilibration procedure. The equilibration procedure is much the same that was utilized to produce the diorganopolysiloxane polymer, the main difference being in the use of an acidic catalyst for the equilibration procedure versus a basic catalyst such as potassium hydroxide with the equilibration procedure of the diorganopolysiloxane polymer. Briefly, the catalyst, whether it be an acid catalyst or alkali metal hydroxide catalyst in equilibration procedure should be utilized at a concentration of anywhere from 5 to 500 parts per million. The cyclic tetra siloxanes containing alkoxy groups or hydride groups may be obtained by the hydrolysis of the appropriate halosilanes and then the cracking of the hydrolyzate with a basic catalyst to preferentially distill overhead and separate in a fairly pure form the appropriate hydrogen cyclictetrasiloxanes or alkoxy containing cyclictetrasiloxanes. For more information as to the preparation of such polyether polysiloxane copolymers reference is made to the foregoing patents discussed above which are incorporated into the present case by reference and specifically, the Moeller U.S. Pat. Nos. 3,965,150, Holdstock 3,629,165.

Another procedure for preparing the polyether polysiloxane copolymers having a carbonyl linkage is by equilibrating at elevated temperatures the appropriate cyclictetrasiloxanes containing cyanoalkyl substituent groups. After the equilibration procedure is terminated wherein about 85% of the cyclictetrasiloxanes have been converted to the linear polymer, the acidic catalyst is neutralized and the excess cyclics are vented off to leave behind the desired cyanoalkyl substituted linear polysiloxane. The resulting polysiloxane is then reacted with water in the presence of strong acid such as hydrochloric acid to convert the cyano group to carboxylic acid groups. The carboxylic acid substituted linear polysiloxane with the desired substituted of carboxylic acid groups is then reacted with a hydroxy terminated polyether to result in the desired polyether polysiloxane copolymer having carbonyl linkages. There are other examples of preparation of such compounds which will not be gone into here, the above description being given as examplary. Suffice to state that the preparation of such polyether polysiloxane copolymers is well known in the art to produce the desired copolymer and such copolymers may be utilized in the concentrations disclosed above to produce the desired static electricity dissipating heat curable silicone rubber composition. It should also be noted that it is possible and there can be utilized as a static dissipating additive in the invention a polyether polysiloxane copolymer in which the polyether moieties are appended only to the internal silicone atom in the internal part of the polysiloxane chain. The polyether polysiloxane copolymers of the instant case may be added in any order to produce the heat curable silicone rubber compositions. The order of mixing the ingredients is not important. Preferably, it is desired that the filler treated or untreated be added to the polysiloxane polymer first with the process aid and the filler incorporated into the diorganopolysiloxane polymer in a dough mixer or in similar apparatus to form a uniform mixture. At that time it is desired to add the other additives and also to add the static dissipating additive of the instant case. the peroxide curing catalyst is preferably added last or milled into the composition last prior to the final packaging of the composition. After the composition has been molded to the desired part with the peroxide curing catalyst, it is simply heated to elevated temperatures at temperatures of 100° C. or above to cure the composition to a silicone elastomer. However, in spite of the above preferred mixing procedure set forth, there may be utilized any procedure in the mixing of the ingredients without any detrimental effects. In the instant composition there is also another ingredient that may be utilized as the preferred additive. Accordingly, there may be added to 100 parts of the base diorganopolysiloxane polymer from 1 to 25 parts by weight of a linear diorganopolysiloxane polymer having a viscosity of anywhere from 50 to 50,000 centipoise at 25° C. Such a material may be added to the compositions of the instant case as a diluent to enhance the mixture of the ingredients and to also aid in the static dissipating properties of the cured elastomer. Preferably the organo groups of such linear diorganopolysiloxane polymer having a viscosity of anywhere from 50 to 50,000 centipoise and more preferably having a viscosity of 100 to 10,000 centipoise at 25° C. are selected from lower alkyl radicals from 1 to 8 carbon atoms, vinyl radicals and phenyl radicals. Most preferably, the organo substituent groups of such low viscosity linear diorganopolysiloxane polymer are selected from methyl and vinyl substituent groups where the vinyl concentration does not exceed 1 mole percent in the composition. Preperation of such polymers is known in the art and is essentially the same for the base diorganopolysiloxane polymer except that in this case in the equilibration the polymer is catalyzed with a mild acid instead of a strong base.

Such low viscosity diorganopolysiloxane polymer need not be used in the composition of the instant case. Previously, other additives may be utilized in the compositions of the instant case as long as they do not interfere with the static dissipating properties of the additives. It should also be noted that the concentration of the static dissipating additive of the instant case, will vary from application to application depending on the type of ingredients that are present in the composition. Generally, as stated previously, per 100 parts of the base diorganopolysiloxane polymer there may be utilized from 0.1 to 1.5 parts by weight of the static dissipating additive. If more than 1.5 part is utilized then such concentration of the static dissipating additive may cause improper cure of the composition and affect its physical properties. If less than 0.1 parts is utilized, then the static dissipating additive does not properly perform its function. It is desired to utilize from 0.2 to 0.7 parts of the static dissipating additive. This range has been found to yield the maximum benefits of static dissipating without detracting from the resulting physical properties of cured elastomer. In addition, the conjunctions of the instant case provide good bonds to substrates and especially metallic substrates such as aluminum or stainless steel with the use of primers.

In the examples below, a very general test was utilized to determine the static dissipating properties of the cured elastomer which will herein be referred to as the cigarette ash test. Briefly, after the cured composition had been formed, a static charge was placed on the composition and some cigarette ashes were allowed to fall on the surface of the elastomer. If the cigarette ash stuck to the elastomer, then the composition did not have sufficient static electricity dissipating properties. If the cigarette ash could be easily blown away from the surface of the elastomer, then the cured elastomer had the proper static electricity dissipating properties.

The examples below are given for the purpose of illustrating the invention of the instant case and not given for the purpose of setting limits and boundaries to the scope of the invention. All parts are by weight.

EXAMPLE #1:

There was mixed 63 parts of 0.2 mole percent methylvinyl, 5.3 mole percent phenylmethyl polysiloxane of a viscosity of 50,000,000 centipoise at 25° C. To this there was added 37 parts of 5.3 mole percent diphenyldimethyltrimethylsiloxy endstopped polysiloxan gum of a viscosity of 50,000,000 centipoise at 25° C., 0.25 parts of water 8 parts of methoxy endstopped dimethyldiphenylpolysiloxane polymer which was utilized as a process aid and which had a viscosity of between 33 to 60 centipoise at 25° C. To this there was added 26 parts of a fumed silica treated with a cyclic polysiloxane. To this there was added 5.4 parts of a dimethyl polysiloxane fluid, as a diluent having trimethyl siloxy chainstopping units, and having a viscosity of 20 centipoise at 25° C. To this there was added 0.8 parts of polyether polysiloxane copolymer of the formula,

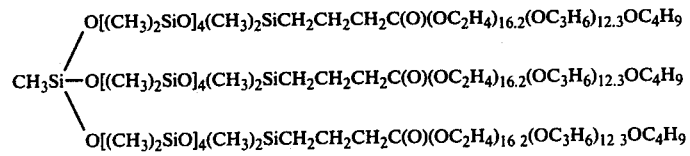

To this the above composition was then cured with 0.5 parts of dicumyl peroxide at 10 minutes at 350° F. plus there was utilized a post cure of 4 hours at 400° F. The cured elastomer passed the cigarette ash est and had the following physical properties:

Shore A Durometer pi: 25
Tensile strength psi: 900
Elongations: 600%
Tear, Die B: 80 ppi

EXAMPLE #2:

There was prepared a composition containing 100 parts by weight of a polymer composed of 0.2 mole percent of methyl vinyl diorganosiloxy units 5.3 mole percent of diphenylsiloxy units, the rest of the substituent groups being dimethyl siloxy groups with triorganosiloxy terminal chainstopping units in the polymer. The polymer has a viscosity of 50,000,000 centipoise at 25° C. To this polymer there was added 1 part of distilled water; 8 parts by weight of a methoxy dimethyl siloxy chainstopped polydimethyldiphenyl siloxane process aid, having a viscosity of 33 to 60 centipoise at 25° C., and 26.7 parts of fumed silica treated with octylmethylcyclictetrasiloxane. To 100 parts of the above mixture there was added 3.6 parts of a trimethyl siloxy endstopped dimethyl polysiloxane of 20 centipoise at 25° C. and 0.6 parts of the polyether polysiloxane static reducing additive of Example I. Into the resulting composition there was milled 0.5 parts of dicumyl peroxide and the composition after having been fabricated to a sheet was cured by heating the composition for 10 minutes at 350° F. The composition was then post-cured for 4 hours at 400° F. so as to stabilize its properties. The resulting elastomer sheet passed the cigarette test easily and had the following physical properties:

Shore A Durometer pi: 30
Tensile strength psi: 1000
Elongation: 600%
Tear, Die B ppi: 85

I claim:
1. A static dissipating heat curable silicone rubber composition comprising (1) 100 parts by weight of diorganopolysiloxane polymer having a viscosity varying from 1,000,000 to 200,000,000 centipoise at 25° C. where the organo group is selected from the class consisting of monovalent hydrocarbon radicals and halogenated monovalent hydrocarbon radicals; (2) from 5 to 150 parts by weight of a filler; (3) from 0.1 to 10 parts by weight of a peroxide curing catalyst; and (4) from 0.1 to 1.5 parts by weight of a polyether polysiloxane copolymer additive of the formula,

$$A_w \cdot B_v$$

where A is the polysiloxane moiety and B is the polyether moiety where w is a whole number varying from 1 to 100 and v is a whole number varying from 1 to 200.

2. The composition of claim 1 wherein the linkage between the A moiety and the B moiety in the polyether polysiloxane additive is Si—O—C.

3. The composition of claim 1 wherein the linkage between the A moiety and the B moiety in the polyether polysiloxane additive is Si(CH$_2$)$_t$ where t varies from 2 to 20.

4. The composition of claim 1 wherein the linkage between the A moiety and the B moiety in the polyether polysiloxane additive is

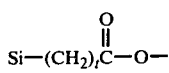

where t varies from 2 to 20.

5. The composition of claim 1 wherein in the polyether polysiloxane additive the polyether moiety B is composed of ethylene oxide units.

6. The composition of claim 1 wherein in the polyether polysiloxane additive the B is composed of ethylene oxide and propylene oxide units.

7. The composition of claim 1 wherein in the polyether polysiloxane additive the B moiety is composed of ethylene oxide, propylene oxide and butylene oxide units.

8. The composition of claim 4 wherein the polyether polysiloxane additive has the formula,

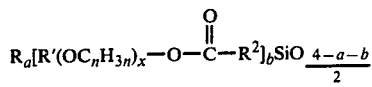

wherein R and R' are monovalent hydrocarbon radicals of less than 8 carbon atoms, $R^2$ is selected from alkylene and arylene radicals of up to 20 carbon atoms, n is an integer that varies from 2 to 4, x varies from 5 to 30 for the case n is equal to 2 and x varies from 1 to 40, for the case n is equal to 3 or 4 where there may be ether units with n equal to 2, 3 and 4 in the same molecule, a is a whole number varying from 1.51 to 1.99 and b varies from 0.019 to 0.45 where the sum of a + b varies from 2.012 to 2.1.

9. The composition of claim 4 wherein the polyether polysiloxane additive has the formula,

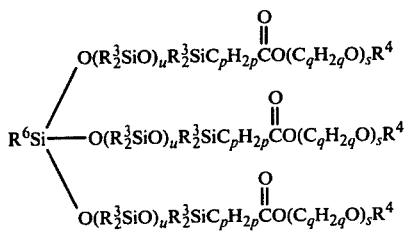

where $R^6$ and $R^3$ are monovalent hydrocarbon radicals, $R^4$ is a lower alkyl radical of 1 to 8 carbon atoms, u has a value of at least 2, p has a value from 2 to 3, inclusive, q has a value from 2 to 4, inclusive, and s has a value of at least 5.

10. The composition of claim 1 wherein the filler is selected from the class consisting of fumed silica, precipitated silica, titanium dioxide, lithopone, zinc oxide, zirconium silicate, silica aerogel, iron oxide, diatomaceous earth, calcium carbonate, glass fibers, magnesium oxide, chronic oxide, zirconium oxide, aluminum oxide, alpha quartz, calcined clay and cork.

11. The composition of claim 1 wherein the diorganopolysiloxane contains from 0.002 to 0.5 percent by weight of vinyl groups and from 1 to 10 percent by weight of phenyl groups.

12. A process for producing a static dissipating heat cured silicone rubber composition comprising (a) mixing (1) 100 parts by weight of a diorganopolysiloxane polymer having a viscosity varying from 1,000,000 to 200,000,000 centipoise at 25° C. where the organo groups are selected from the class consisting of monovalent hydrocarbon radicals and halogenated monovalent hydrocarbon radicals; (2) from 5 to 150 parts by weight of a filler; (3) from 0.1 to 10 parts by weight of a peroxide curing catalyst; and (4) from 0.1 to 1.5 parts by weight of a polyether polysiloxane copolymer additive of the formula,

where A is the polysiloxane moiety and B is the polyether moiety where w is a whole number varying from 1 to 100 and v is a whole number varying from 1 to 200; and (b) heating the mixture at temperatures above 100° C.

13. The process of claim 12 wherein the linkage between the A moiety and the B moiety in the polyether polysiloxane additive is Si—O—C.

14. The process of claim 12 wherein the linkage between the A moiety and the B moiety in the polyether polysiloxane additive is $Si(CH_2)_t$ where t varies from 2 to 20.

15. The process of claim 12 wherein the linkage between the A moiety and the B moiety in the polyether polysiloxane additive is

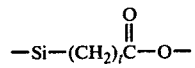

where t varies from 2 to 20.

16. The process of claim 12 wherein in the polyether polysiloxane additive the polyether moiety B is composed of ethylene oxide units.

17. The process of claim 12 wherein in the polyether polysiloxane additive the B is composed of ethylene oxide and propylene oxide units.

18. The process of claim 12 wherein in the polyether polysiloxane additive the B moiety is composed of ethylene oxide propylene oxide, and butylene oxide units.

19. The process of claim 15 wherein the polyether polysiloxane additive has the formula,

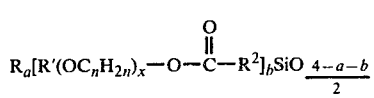

wherein R and R' are selected from the class consisting of monovalent hydrocarbon radicals of less than 8 carbon atoms, $R^2$ is selected from alkylene and arylene radicals of up to 20 carbon atoms, n is an integer that varies from 2 to 4, x varies from 5 to 30 from the case n is equal to 2, and x varies from 1 to 40, for the case n is equal to 3 or 4 where there may be units with n equal to 2, 3 and 4 in the same molecule, a is a whole number varying from 1.51 to 1.99 and b varies from 0.019 to 0.45 where the sum of a + b varies from 2.012 to 2.1.

20. The process of claim 15 wherein the polyether polysiloxane additive has the formula,

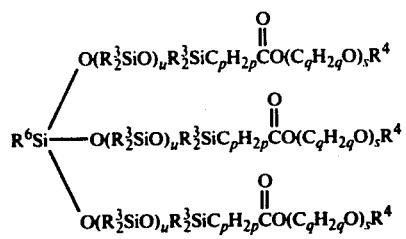

where $R^6$ and $R^3$ are monovalent hydrocarbon radicals, $R^4$ is a lower alkyl radical of 1 to 8 carbon atoms, u has a value of at least 2, p has a value from 2 to 3, inclusive, q has a value from 2 to 4 inclusive, and s has a value of at least 5.

21. The process of claim 12 wherein the filler is selected from the class consisting of fumed silica, precipitated silica, titanium dioxide, lithopone, zinc oxide, zirconium silicate, silica aerogel, iron oxide, diatomaceous earth, calcium carbonate, glass fibers, magnesium oxide, chronic oxide, zirconium oxide, aluminum oxide, alpha quartz, calcined clay, and cork.

22. The process of claim 12 wherein the diorganopolysiloxane contains from 0.1 to 0.5 weight percent vinyl groups and from 1 to 10 weight percent of phenyl groups.

* * * * *